United States Patent
Showalter (10) Patent No.: US 7,614,805 B2
(45) Date of Patent: Nov. 10, 2009

(54) IMAGE CAPTURE DEVICE MOUNTING ASSEMBLY FOR FIREARM

(76) Inventor: Joseph Showalter, 304 Spring St., Granby, MO (US) 64844

( * ) Notice: Subject to any disclaimer, the term of this patent is extended or adjusted under 35 U.S.C. 154(b) by 422 days.

(21) Appl. No.: 11/557,189

(22) Filed: Nov. 7, 2006

(65) Prior Publication Data
US 2008/0107414 A1    May 8, 2008

(51) Int. Cl.
*G03B 17/00* (2006.01)
*F41C 27/00* (2006.01)

(52) U.S. Cl. .................. 396/428; 396/429; 42/106

(58) Field of Classification Search ............. 396/419, 396/420, 421, 426, 428, 429; 248/176.1, 248/177.1, 187.1; 42/106; 348/61, 373, 348/374, 375, 376; 352/95, 131
See application file for complete search history.

(56) References Cited

U.S. PATENT DOCUMENTS

| | | | |
|---|---|---|---|
| 3,200,499 A * | 8/1965 | Kingston | ............ 42/141 |
| 4,309,095 A | 1/1982 | Buckley | |
| 4,835,621 A | 5/1989 | Black | |
| 4,929,973 A * | 5/1990 | Nakatani | ............ 248/177.1 |
| 5,020,262 A | 6/1991 | Pena | |
| 5,429,332 A * | 7/1995 | Ishikawa | ............ 248/187.1 |
| 5,887,375 A | 3/1999 | Watson | |
| 6,192,614 B1 | 2/2001 | Cliburn | |
| 6,425,697 B1 | 7/2002 | Potts et al. | |
| 2004/0257437 A1 * | 12/2004 | Lesseu | ............ 348/61 |

* cited by examiner

*Primary Examiner*—Kenneth J Whittington
(74) *Attorney, Agent, or Firm*—Husch Blackwell Sanders LLP (57) ABSTRACT

A mounting assembly for an image capture device, such as camera, configured for mounting on a firearm is provided. The image capture device mounting assembly for a firearm comprises a base member attached to a scope of the firearm above the top of the scope, the base member having a longitudinal axis in substantial parallel relationship with a longitudinal axis of the scope; an intermediate plate, the intermediate plate being pivotally attached to the base member; a mounting bracket, the mounting bracket being mounted on the intermediate plate, the mounting bracket being adapted to support a camera, the mounting bracket having a camera attachment mechanism for allowing attachment of the camera to the mounting bracket at a predetermined position; and a locking mechanism for fixing the pivoting intermediate plate at a desired pivotal position.

10 Claims, 8 Drawing Sheets

IMAGE CAPTURE DEVICE MOUNTING ASSEMBLY FOR FIREARM

BACKGROUND OF INVENTION

The present invention relates generally to mounts for image capture devices, such as cameras or the like and, more particularly, to an improved mounting assembly for supporting a camera, such as a movie or video camera, from a structure or other object such as a weapon.

The sport of target shooting has become very popular in recent years. This sport has taken several forms and includes the use of rifles, hand guns, air guns or the like. In the sport of hunting, it is often desirable to record the shoot on film such as through the use of a movie or video camera. Obtaining such a record of the hunt allows the hunter to later review his or her shots and receive valuable feedback particularly when the selected target is missed. Additionally, after group hunts, reviewing the film with the other members of the hunting party is entertaining and builds camaraderie by allowing the hunters to discuss both the big kills and the "one that got away." Further, the hunter can use the video camera zoom set at his personal preference in yards to his targets (e.g. 50, 100, or 150) so that the hunter can see the outcome of the shoots just taken.

Camera mounts that attach to the side of a rifle or other firearms are known. While accuracy and precision are extremely important to target shooters, such considerations are also important to other applications including, but not limited to, hunting and military. However, the weight of the video camera may affect the rifle's balance, trigger pull and trajectory and, due to its weight, the camera should be removed from the rifle when it is not in use. The weight of the video camera can also prevent the hunter from instant response to the motion of targeting animals. Some known camera mounts for a rifle allows the video camera to be removably attached to the rifle.

Specific examples in the prior art illustrate these deficiencies.

U.S. Pat. No. 6,425,697, issued to Potts, discloses a mount for attachment to the structure, a camera support, and a pair of depending swing arms extending between the mount and the camera support and forming a parallelogram linkage, whereby at least one swing arm allows the camera support to swing to and fro while keeping a line of sight of the camera substantially parallel to the mount at all times.

U.S. Pat. No. 6,192,614, issued to Cliburn, discloses camera mounting systems for a firearm, such as a rifle, that incorporates a shock-absorbing mechanism to protect the camera from a "recoil" of the firearm. The systems comprise a pair of opposing mounting brackets, one for each side of the firearm, to be secured thereagainst by plural fastening members overriding and underriding the firearm. A first mounting bracket, on a face opposite to the firearm, includes a horizontally-movable shock-absorbing mechanism wherein the mechanism is intended to react to and absorb the recoil action of the firearm. A third, essentially planar plate, is secured to the shock-absorbing element and a rear end thereof mounts a laterally extending pivotal rod.

U.S. Pat. No. 5,887,375, issued to Watson, teaches a camera mount for firearms. The mount includes a base plate, an intermediate plate operatively attached to the base plate, a dampening material operatively attached between the base plate and the intermediate plate for dampening recoil forces transmitted to the intermediate plate, and a mounting bracket removably attached to the intermediate plate. The mounting bracket includes a camera attachment device for allowing attachment of a camera to the mounting bracket and an adjustment mechanism is provided that is operatively connected between the intermediate plate and the mounting bracket for allowing the camera to be aligned with respect to the firearm. The camera mount further includes a firearm mounting device, operatively attached to the base plate, for mounting the camera mount to the firearm.

U.S. Pat. No. 4,835,621, issued to Black, relates to a video camera having a gunstock and a support structure that includes a mounting platform adapted to receive thereon a hand-held video camera having a lens structure defining a line of sight, a recording medium for recording video information, and a viewfinder and mounting structure for mounting the viewfinder onto the gunstock. Structure is provided for effecting a sequential activating and deactivating of the video camera recording device for the purpose of starting a recording of video information onto the recording medium and stopping the recording, respectively. A gun sight is located in the line of sight so as to be visible through the viewfinder when the video camera recorder is recording video information on the recording medium. A trigger is provided on the gunstock and is adapted to be manually activated by a finger of a user's hand. A signal generator is also provided which generates a signal visible through the viewfinder in response to the user activating the trigger. The signal is also simultaneously recorded on the recording medium.

U.S. Pat. No. 5,020,262, issued to Pena, discloses a camera mount for use on a telescope in combination with a rifle. The mount is clamped onto the telescope and has a camera attached to the top of the mount. A cable mechanism is attached at one end to the shutter release of the camera and at the other end to the trigger of the rifle. The camera is arranged to photograph the image received through the telescope and reflected through the mount. The cable mechanism provides means for controlling the operation of the camera. A housing is clamped onto the telescope and has an eyepiece that fits onto the eyepiece of the telescope and contains a split prism that is positioned in the eyepiece at an angle such that it can be seen through for viewing the image of the target received through the telescope. The split prism has a reflective surface on one side that reflects the image of the target upwardly to a first surface mirror positioned in the housing above the split prism at an angle such that it receives the image reflected from the split prism, and then reflects the image forwardly to a second surface mirror. A second surface mirror is positioned at the forward end of the housing and at an angle such that it receives the image reflected from the first surface mirror, and then reflects the image upwardly to the camera lens. The image of the target is photographed when the trigger of the rifle is pulled.

U.S. Pat. No. 4,309,095, issued to Buckley, teaches a camera mounting device for mounting a camera to a hunting rifle. The device includes a first mounting bracket adapted to support a camera, a threaded fastener to detachably secure a camera to the first bracket, a variable diameter clamp to clamp the first mounting bracket to the barrel of the telescope sight of a rifle, a cable release for remote actuation of the camera, a second mounting bracket connected to the cable release, and threaded fasteners for detachably securing the second mounting bracket to the trigger guard of a rifle so that actuation of the cable release is coordinated to actuation of the rifle trigger.

Some known video camera mounts are attached to the side of the gun barrel or one side of the scope-mounting bracket. How a video camera is attached to the firearm can have an significant impact on the firearm's accuracy. Attachment of the camera to the side of the firearm is one significant source of firearm inaccuracy due to the resultant weight imbalance.

Mechanical sights have limited value in many situations where an officer must quickly draw his gun, perhaps while moving, and fire at a close target without sufficient time to properly obtain a sight picture. Under these circumstances, instinctive aiming, that is, not using the sights but rather "feeling" where the gun barrel is pointing using the positioning of the hand holding the gun, is the preferred method. Many hunters and marksmen rely on their inner sense of balance to ensure that the firearm is not tilted. This attitude presupposes that the shooter has a fully functional, unimpaired sense of balance and that this sense of balance can somehow be translated over into the handling of the firearm. One's sense of balance is likewise subject to a number of disorienting influences including rifle recoil, the loud noises associated with shooting, repeated focusing on distant targets as viewed through one eye, and prolonged periods of standing. Weight imbalance can also be a disorienting influence. In addition, hunters may spend hours of hiking through rough and uneven terrain before firing a shot. The hunter's sense of balance can be confused under such circumstances. Thus, there is a need in the art for an improved video camera mount for firearms with greater stability in supporting the camera.

Moreover, the tip of the rifle barrel makes the video pictures more realistic and interesting. However, known mounts do not allow the tip of the rifle barrel to be visible through the video camera attached to the mount. Moreover, some known video camera mounts that attach to the top of the scope mounted on the top of the barrel, do not provide adjustment of the camera by rotation. However, it is desirable to realign the line of sight of the camera with the firing line of the rifle upon mounting of a video camera.

Thus, there is also a need in the art for an improved video camera mount for firearms. The present invention provides an advance in the art by providing an image capture device mounting assembly for firearms having greater stability than known mounts and providing the user with a simple means for adjusting the mount.

While the known mounts present a number of alternatives for video-recording of a target or potential "kill", these alternatives are generally complex and less user-friendly than that found in the present invention. The manner by which the invention hereof offers an effective solution to providing the user, i.e., a hunter, with the opportunity to target a potential "kill", will become apparent to those skilled in the art from the following description, particularly when read in conjunction with the accompanying drawings.

Further objectives and advantages of the present invention will become apparent from a careful reading of a detailed description provided hereinbelow with appropriate reference to the accompanying drawings.

SUMMARY OF INVENTION

The present invention, in one embodiment, includes an image capture device mounting assembly for a firearm, such as a rifle. The image capture device mounting assembly for a firearm comprises a base member attached to a scope of the firearm above the top of the scope, the base member having a longitudinal axis in substantially parallel relationship with a longitudinal axis of the scope; an intermediate plate, the intermediate plate being pivotally attached to the base member; a mounting bracket, the mounting bracket being mounted on the intermediate plate, the mounting bracket being adapted to support a camera, the mounting bracket having camera attachment means for allowing attachment of the camera to the mounting bracket at a predetermined position; and locking means for fixing the pivoting intermediate plate at a desired pivotal position. The base member comprises a variable diameter clamp means for clamping engagement to the scope of the firearm. The clamp means comprises a mounting plate for supporting the intermediate plate, a first clamp element having a concave recess adapted to receive the barrel of the scope, the first clamp element being attached to the mounting plate, and a second clamp element having a concave recess adapted to receive the barrel of the scope, the second clamp element being spaced apart from the first clamp element, the second clamp element being attached to the mounting plate.

The mounting bracket can be detachably mounted on the intermediate plate. Further, the mounting bracket can be adjustably mounted on the intermediate plate. The attachment means comprises an alignment pin adapted to align the camera. There is provided three angle shims adapted to adjust the vertical viewing angle of the camera. The locking means comprises a lever end and a locking end, wherein the locking means operates in a locked position in which the locking end engages the pivoting intermediate plate and holds the image capture device mounting assembly in position at one of the plurality of continuous points and in a release position in which the intermediate plate is allowed to rotate. The intermediate plate further comprises a locking knob, wherein the locking knob operates in a locked position in which the locking knob engages the mounting bracket and holds the mounting bracket in position and in a release position in which the mounting bracket is allowed to be detached. The mounting bracket can be slidably mounted on the intermediate plate.

BRIEF DESCRIPTION OF THE SEVERAL VIEWS OF THE DRAWINGS

In the accompanying drawings that form a part of the specification and that are to be read in conjunction therewith and in which like reference numerals are used to indicate like parts in the various views.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Figure 1:
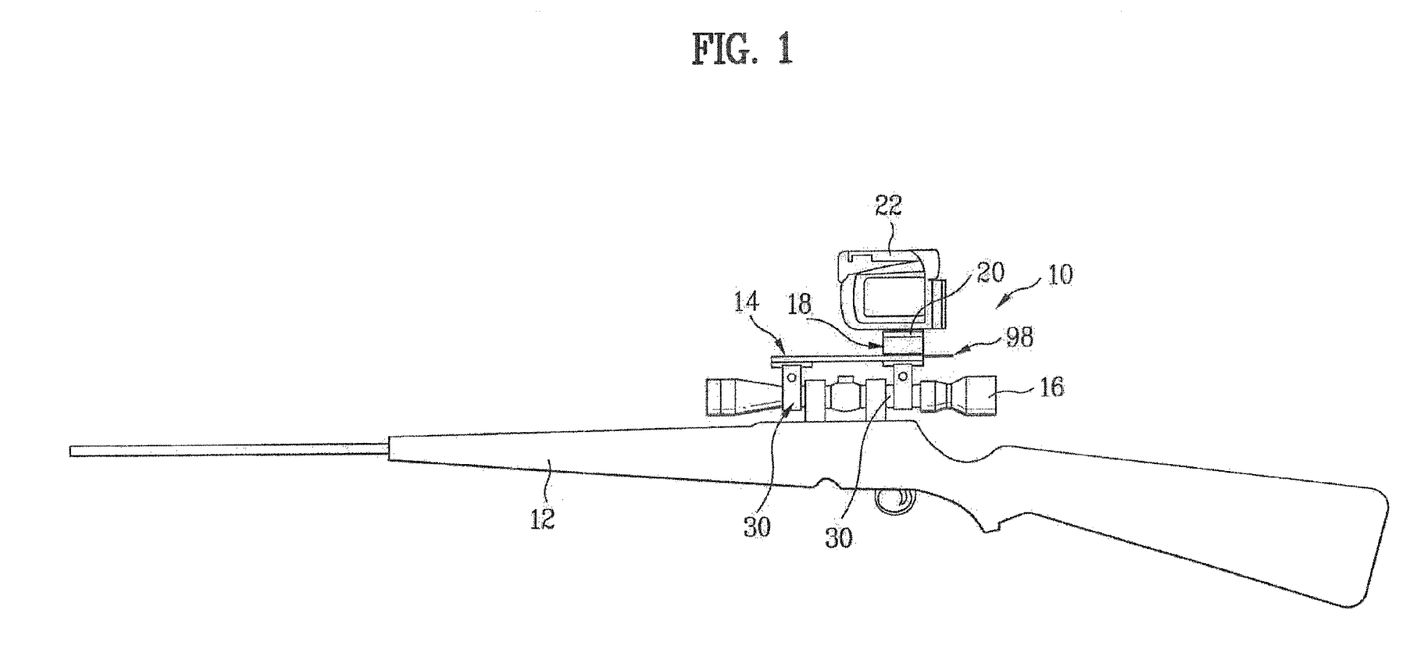
FIG. 1 is a side elevational view of an image capture device mounting assembly mounted to a rifle constructed in accordance with the invention.
Figure 2:
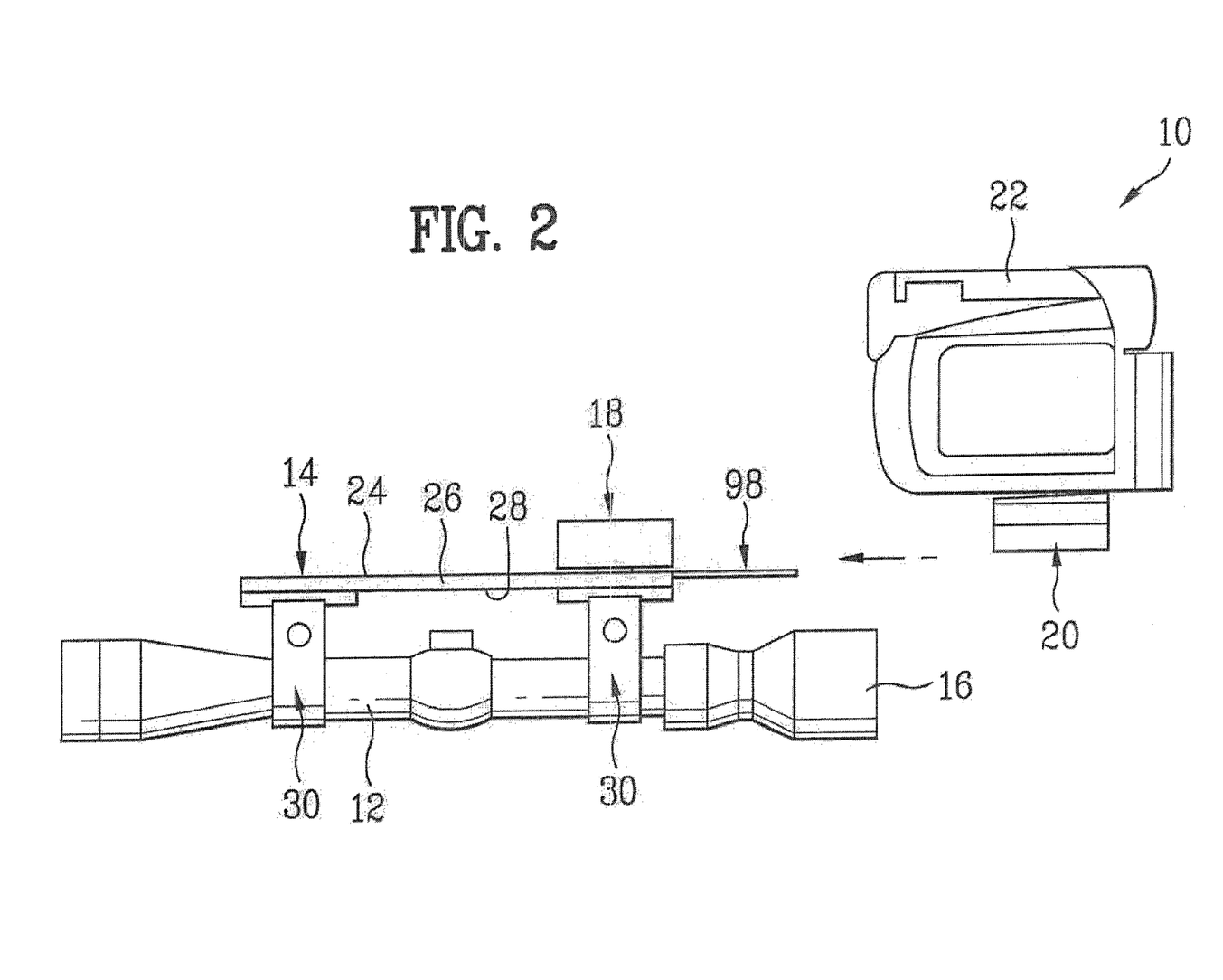
FIG. 2 is a side elevational view of the image capture device mounting assembly.

Reference is now made to FIGS. 1 and 2 which illustrate one embodiment of the inventive image capture device mounting assembly 10 for use on a firearm 12. For purposes of illustration, firearm 12 is shown as a conventional rifle. It should be appreciated, however, that firearm 12 is shown as a rifle only for the purpose of describing one embodiment of the present invention. Those skilled in the art will appreciate that mounting assembly 10 may be used on firearms other than rifles such as shotguns or the like, with or without the use of the specialized mounts and mounting adaptors disclosed hereinbelow.

Figure 3A:
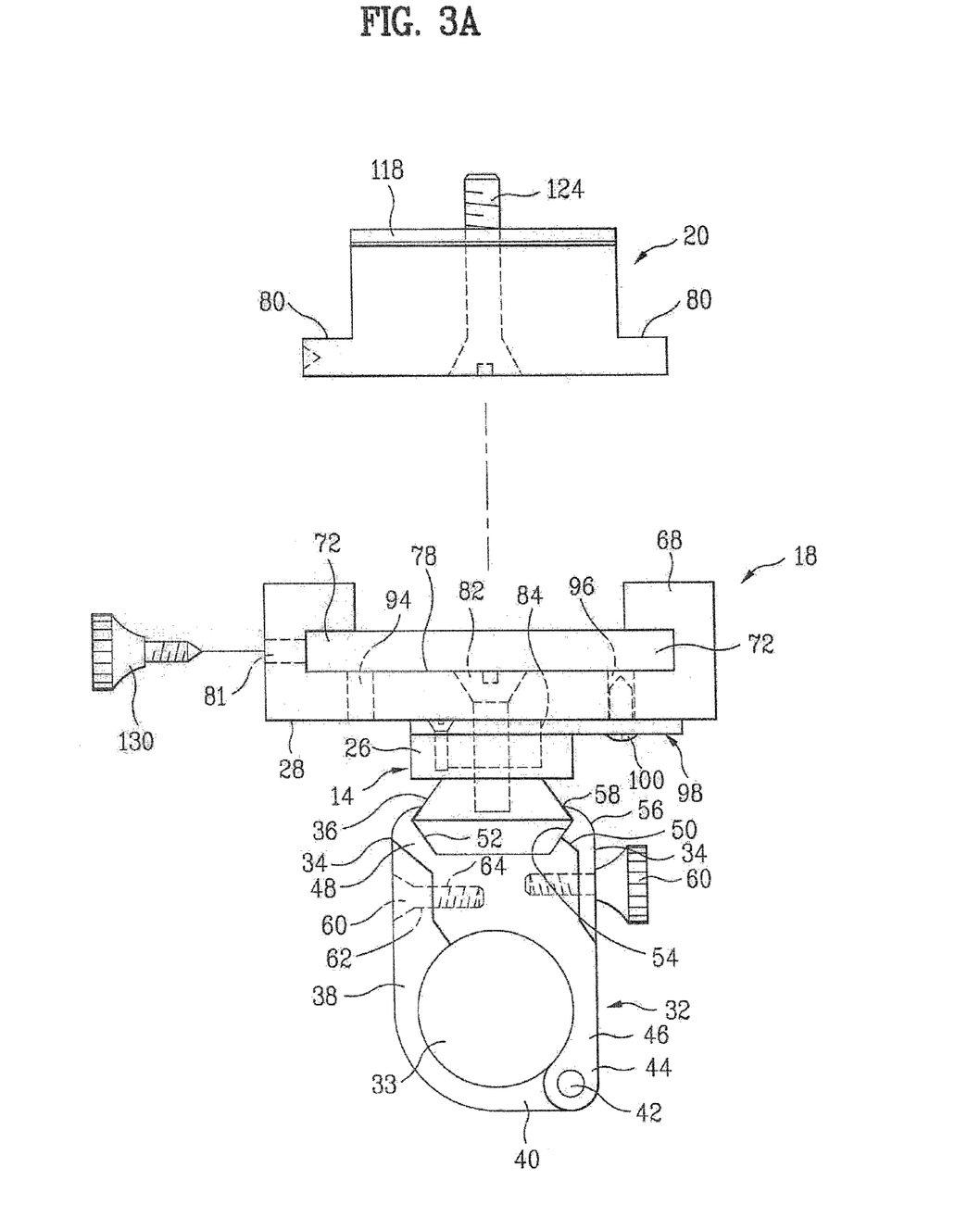
FIG. 3A is a front plan view of the image capture device mounting assembly in which the mounting bracket is detached from the assembly.
Figure 3B:
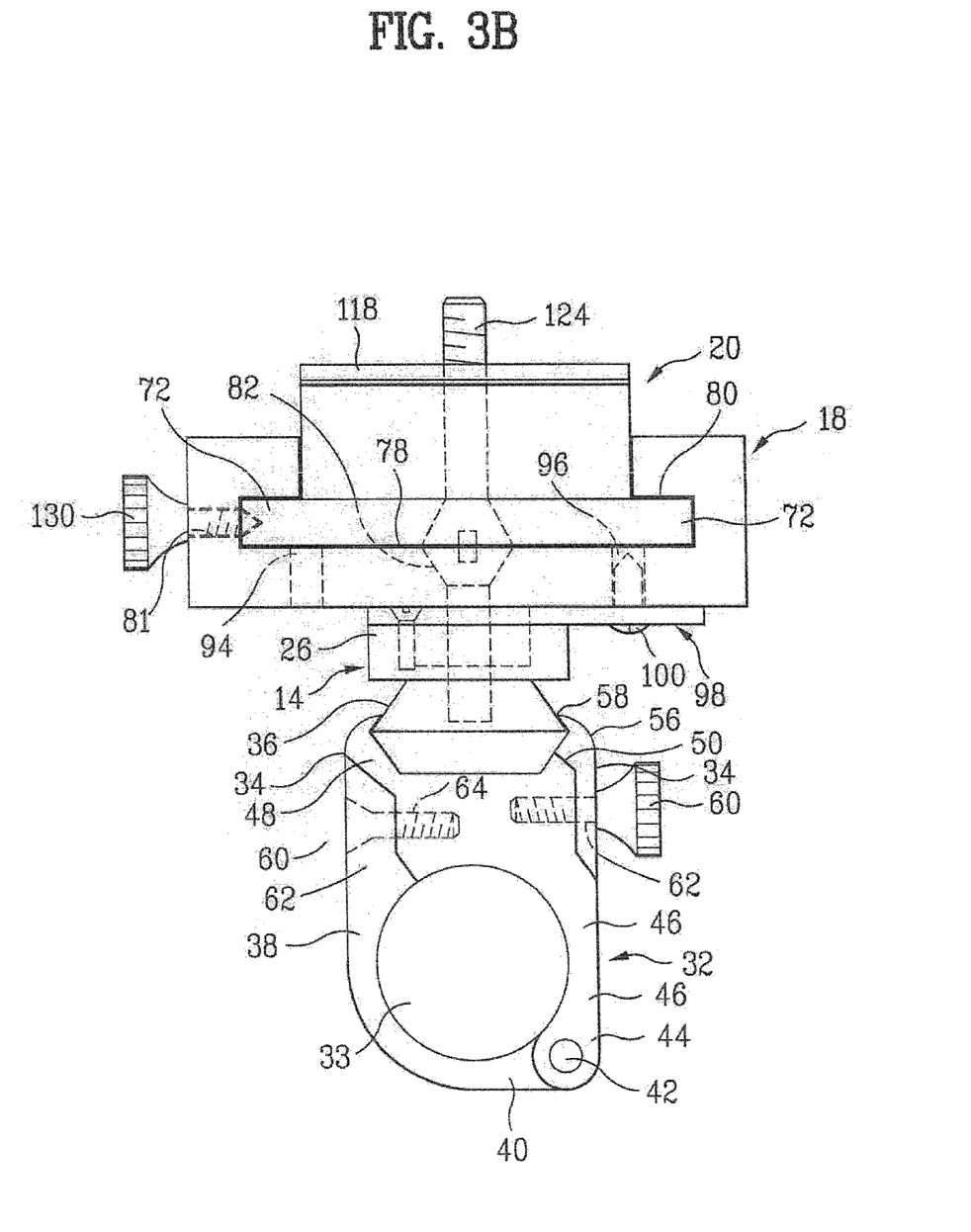
FIG. 3B is a front plan view of the image capture device mounting assembly in which the mounting bracket is attached to the assembly.

Image capture device mounting assembly 10 includes a base member 14 attached to a scope 16 of firearm 12, an intermediate mounting plate 18 pivotally attached to base member 14, a mounting bracket 20 mounted on intermediate plate 18 in the form of a platform for supporting a camera 22. It will be appreciated that camera 22 may be any type of photographic or moving picture device such as a film camera, digital camera, video camera, and the like. As illustrated, base member 14 is shown as a mounting plate having an upper surface 24 configured for receiving and engaging intermediate plate 18. Further, base member 14 includes an elongate generally planar platform 26 having a longitudinal axis in substantially parallel relationship with a longitudinal axis of scope 16. A lower surface 28 of base member 14 further includes clamp means 30 extending downwardly therefrom configured for clamping engagement to scope 16. Mounting assembly 10 is securely attached to scope 14 and movement constrained thereon by clamps 30. Each clamp 30 includes a clamp member 32 forming a scope-receiving throat 33 and having upper ends 34 connected to an mounting plate 36 integrally formed on lower surface 28 of base member 14. As illustrated in FIGS. 3A and 3B, each clamp member 32 includes a first generally C-shaped clamp jaw 38 that is hingedly connected at a first end 40 at hinge pin 42 to a first end 44 of a second generally C-shaped clamp jaw 46. Second ends 48, 50 of jaws 38 and 46, respectively, are affixed or otherwise connected to opposing first and second side edges 52 and 54 of mounting plate 36. A clamp lug 56 may be provided to apply pressure thereby holding clamp members 32 to mounting plate 54 at each of contact points 58. Clamp lug 56 defines a first locking screw aperture 62 therethrough for receiving a locking screw 60 therein. Locking screw 60 passes through first aperture 62 and then into a threaded second locking screw aperture 64 defined by each of clamp jaws 38 and 46 whereby locking screw 60 may be threadably tightened to hold clamp member 32 in place on mounting plate 36. In another embodiment, clamp screws (not shown) may also be used to tighten clamp member 32 by threadably inserting screws into threaded apertures (not shown) on lug 56.

Figure 4A:
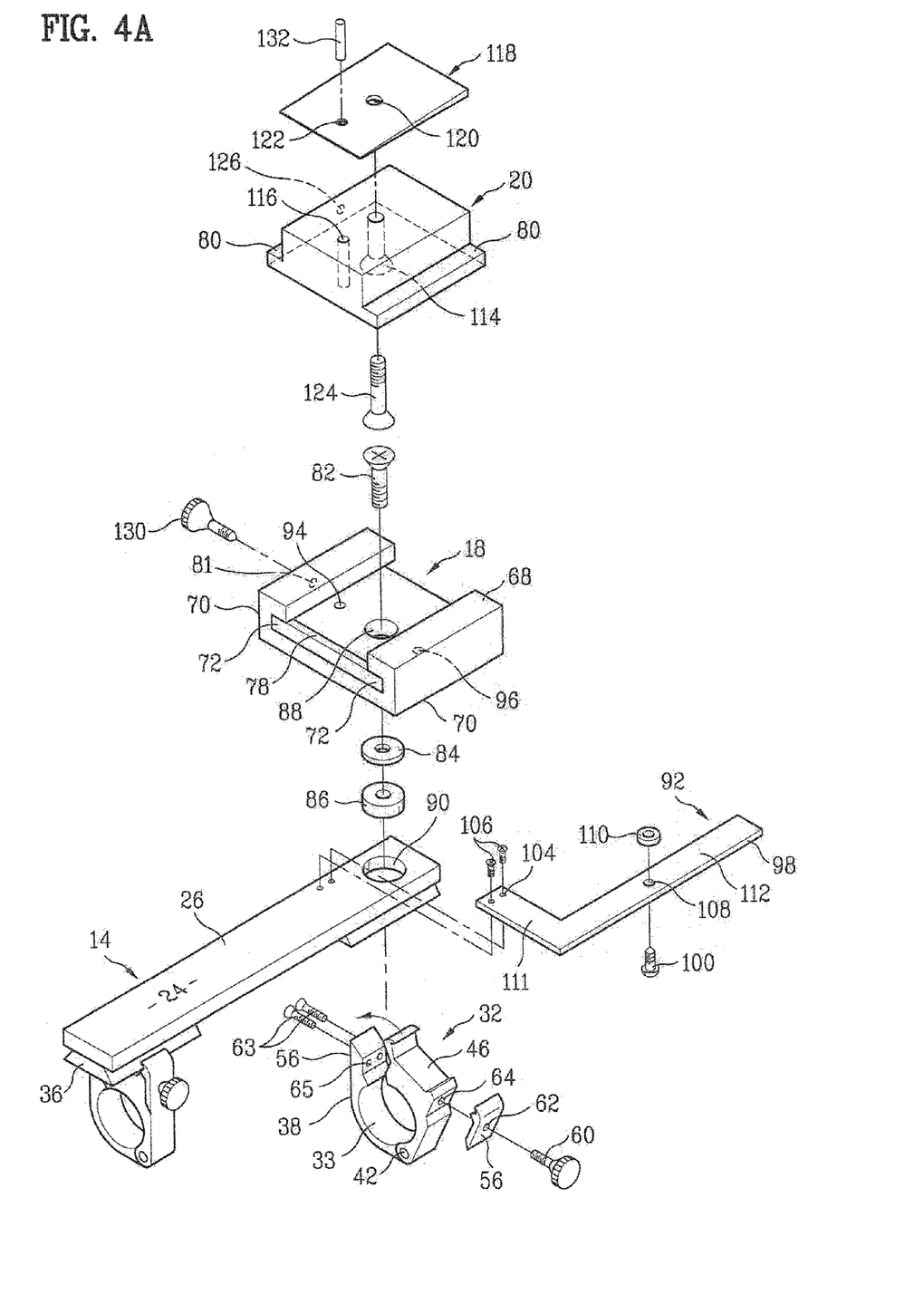
FIG. 4A is an exploded perspective view of the image capture device mounting assembly.
Figure 4B:
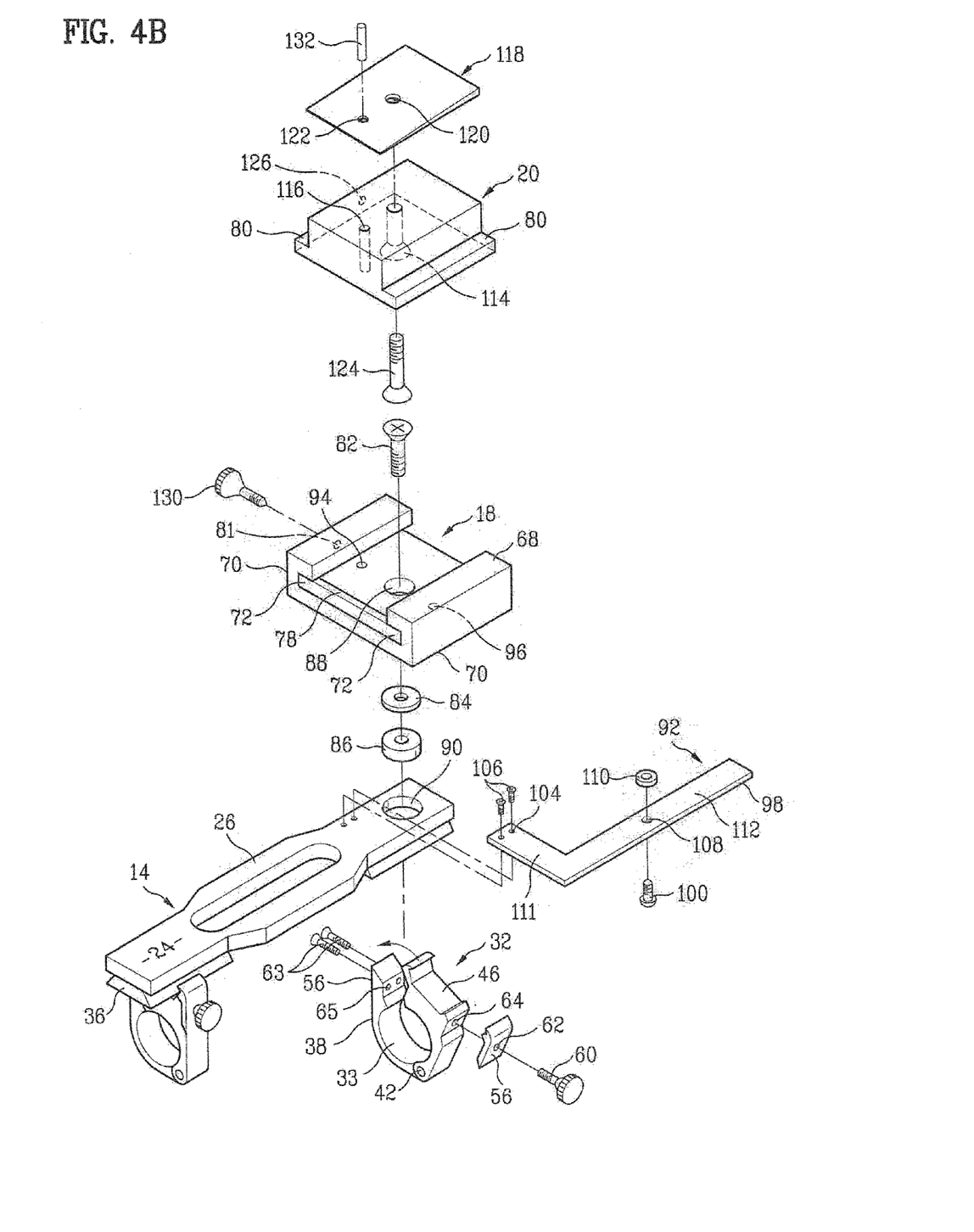
FIG. 4B is an exploded perspective view of the image capture device mounting assembly.

Intermediate plate 18 is positioned on an upper surface 24 of platform 26 of base member 14. Intermediate plate 18 may be a plate having an angled flange 68 extending upwardly from each of side edges 70 and then inwardly at a generally 45° angle to define a channel 72 between flange 68 and an upper surface 78 of intermediate plate 18 wherein each channel 72 is configured to slidably receive one of side flanges 80 of mounting bracket 20. To mount or dismount mounting bracket 20, side flanges 80 of mounting bracket 20 operatively slide within channels 72 in a direction parallel to channels 72. In the exemplary embodiment shown, channels 72 and side flanges 68 are cooperatively adapted to resist movement of the side flanges 68 out of channels 72 in a direction that is perpendicular to channels 72. For example, channels 72 may include a relatively narrow opening (not shown) connected to a wider inner area and side flanges 68 may include a relatively narrow stem (not shown) extending through the narrow opening of channel 72. The stem of side flange 68 may then be connected to a relatively wider portion that extends in the wider inner area of channel 72. At least one of side flanges 68 also define alignment apertures 81 extending therethrough. Turning to FIGS. 4A and 4B, a pivot pin 82, an O-shaped rotating washer 84, and an O-shaped swivel bearing 86 are also provided to pivotally attach intermediate plate 18 to base member 14. Pivot pin 82 passes through a pivot pin hole 88 formed through intermediate plate 18 then through a hole on rotating washer 84 and then through swivel bearing 38. Finally, pivot pin 82 is anchored into a pivot pin hole 90 defined through platform 26. Washer 84 rests between intermediate plate 18 and swivel bearing 86 thereby allowing free rotation of intermediate plate 18. In other words, intermediate plate 18 may freely rotate with respect to base member 14 and is attached thereto by rotating washer 84. Swivel bearing 86 has an aperture concentrically aligned with the pivot pin holes 88 and 90 for receiving pivot pin 82 inserted therethrough. Swivel bearing 86 is pressed into pivot pin hole 90 on platform 26 so as to be locked in place on platform 26. Swivel bearing 86 also functions to allow intermediate plate 18 to rotate about the pivot axis. Alternatively, intermediate plate 18 can be adjustably connected to platform 26 of base member 14 (not shown). Other mechanisms that may be used to rotate intermediate plate 18 will be readily apparent to those skilled in the art and are within the scope of the present invention.

In one embodiment, a locking mechanism 92 is provided to lock intermediate plate 18 at a desired location along locking holes 94 and 96. Locking mechanism 92 includes a lock and release lever 98 having a locking end 111, an opposing lever end 112, and a locking pin 100. Lock and release lever 98 includes a generally L-shaped lever defining a pair of lever apertures 104 therethrough configured to receive lever screws or rivets 106 for securely affixing lock and release lever 98 to platform 26. Lock and release lever 98 further defines a locking pin aperture 108 therethrough and also includes a locking nut 110 for securely attaching locking pin 100 to lock and release lever 98. Locking pin 100 passes through locking pin aperture 108 and is threadably screwed through locking nut 110. Locking pin 100 then extends through one of locking holes 94 or 96. Lock and release lever 98 is normally urged clockwise by hand or a spring. Locking pin 100 thereby locks pivotable intermediate plate 18 in a fixed position relative to base member 14 when locking pin 100 passes through the locking pin aperture 108 and then passes through one of locking holes 94 or 96 on intermediate plate 18. In one embodiment, intermediate plate 18 may have consecutive slots so that the user may adjust the pivotal angle of camera 22. Lock and release lever 98 is securely attached to base member 14 by screws or rivets 106 at locking end 111. Lock and release lever 98 is cantilevered to one side thereof. By pressing down at opposing lever end 112, the pressure will release locking pin 100 when it disengages with locking holes 94 and 96 allowing intermediate plate 18 to rotate until it then reengages with locking pin 100 and is locked in place. To raise or lower lock and release lever 98 relative to intermediate plate 18, a user presses in a downward direction on lever end 112 thereby overcoming the restoring force of resilient lever end 112. This removes locking pin 100 from locking hole 94 or 96. Intermediate plate 18 is then free to rotate relative to its center. When a desired position is reached and locking pin 100 is aligned with one of holes 94 or 96, the user releases pressure on lever end 112 allowing the resilient lever end 112 to restore in an upward direction. This causes locking pin 100 to pass through the selected locking pin hole 94 or 96. Thus, the image capture device mounting assembly 10 is locked at the selected position.

Mounting bracket 20 includes side flanges 80 extending outwardly from opposite lower side edges. Side flanges 80 may define at least one horizontally-aligned alignment aperture 126 extending therethrough. Mounting bracket 20 also includes a locking aperture 114 configured to receive adapter 124 and an aligning pin aperture 116 configured to receive an aligning pin 132. Both locking aperture 114 and aligning pin aperture 116 are formed on the bottom surface of mounting bracket 20 and spaced apart from each other. In one embodiment, an angle shim 118 is also provided to allow for adjustments to be made to the vertical viewing angle of camera 22. Angle shim 118 also includes a corresponding shim locking hole 120 and an aligning aperture 122. An adapter 124 is inserted from the bottom surface of mounting bracket 20 and passed upwardly through locking aperture 114, then is anchored into a hole (not shown) on the bottom surface of camera 22. Adapter 124 attaches mounting bracket 20 to the bottom surface of camera 22. When in use, mounting bracket 20 is slidably coupled to intermediate plate 18. Side flanges 80 are slidably inserted into channels 72 of intermediate plate 18. Alignment aperture 126 is therein provided to align mounting bracket 20 with corresponding alignment aperture 81 on intermediate plate 18 and to fix mounting bracket 20 in place. Once alignment aperture 126 on mounting bracket 20 is in alignment with corresponding alignment aperture 81 on intermediate plate 18, at least one locking screw 130 may then be inserted and threadably tightened into aperture 81 and then aperture 126 to secure mounting bracket 20 to intermediate plate 18.

Figure 5A:
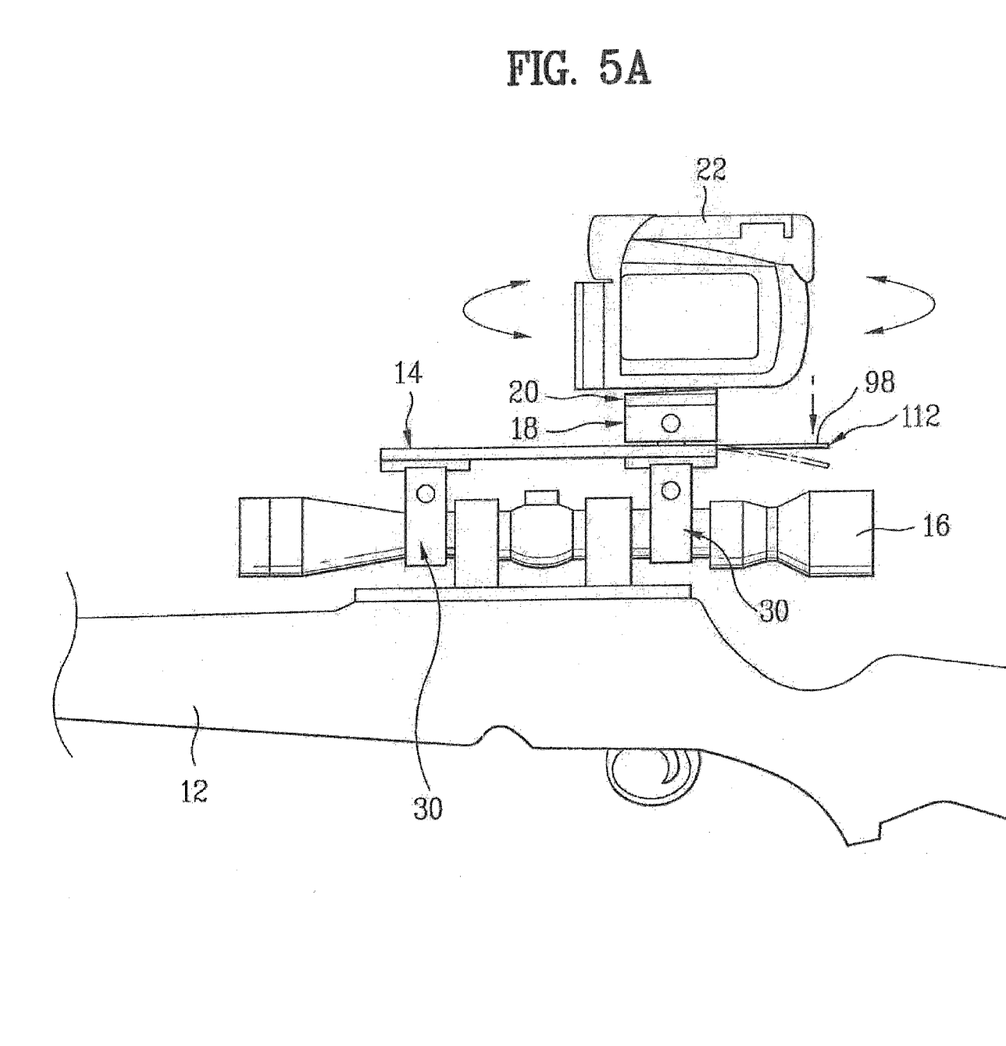
FIGS. 5A and B are side elevational views with a representative illustration showing the rotating motion of the image capture device.
Figure 5B:
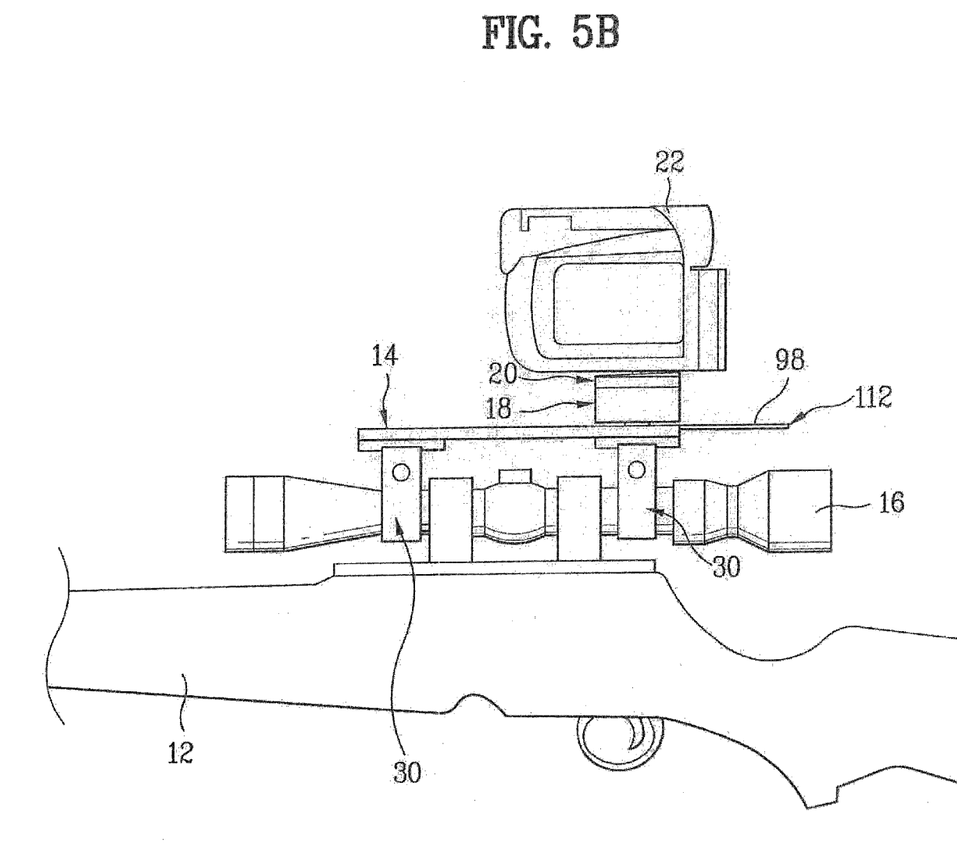

To install mounting bracket 20 on camera 22, as illustrated in FIGS. 3A and 3B, adapter 124 is secured in the tripod bore, not shown, commonly found on the underside of camera 22. Angle shim 118 is then moved into an abutment with camera 22 and the free end of adapter 124 is secured in the tripod bore. Camera 22 is then aligned along adaptor 64 and aligning pin 132. Once camera 22 is securely attached to mounting bracket 20, the user slidably inserts mounting bracket 20 into channels 72 of intermediate plate 18. As should be appreciated, if mounting bracket 20 is properly centered, locking screw 130 is tightened into apertures 81 and 126 to positively secure mounting bracket 20 in place and protect against recoil. If camera 22 is properly centered, but needs to shoot a different angle, intermediate plate 18 on platform 26 of base member 14 may be rotated to adjust the angular position of camera 22 and mounting bracket 20, as shown in FIGS. 5A and 5B. Upon achieving proper alignment and when locking pin 100 is aligned with at least one of locking pin apertures 94 or 96, the user releases pressure on lever end 112 allowing resilient lever end 112 to restore in an upward direction. This causes locking pin 100 to pass through selected locking holes 94 or 96 to ensure that it remains held in the desired position.

To remove camera 22 from firearm 12, locking screw 130 is loosened and mounting bracket 20 is slid from channels 72 of intermediate plate 18. As should be appreciated, mounting bracket 20 can remain installed on camera 22, with angle shim 118 ensuring that the previously determined position is maintained. To reinstall camera 22, mounting bracket 20 is simply slid into channels 72 and locked in place using locking screw 130. The alignment is memorized and, thus, no significant adjustment is necessary when camera 22 is returned to the support.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An image capture device mounting assembly for a firearm, the assembly comprising:

a base member attached to a scope of the firearm above the top of said scope, the base member having a longitudinal axis in substantial parallel relationship with a longitudinal axis of said scope;

an intermediate plate, the intermediate plate being pivotally attached to said base member;

a mounting bracket, the mounting bracket being mounted on said intermediate plate, the mounting bracket being adapted to support a camera, the mounting bracket having camera attachment means for allowing attachment of said camera to said mounting bracket at a predetermined position; and locking means for fixing said pivoting intermediate plate at a desired pivotal position;

wherein said locking means comprises a lever end and a locking end, wherein said locking means operates in a locked position in which said locking end engages the pivoting intermediate plate and holds the image capture device mounting assembly in position at one of a plurality of continuous points and in a release position in which the intermediate plate is allowed to rotate.

2. An image capture device mounting assembly for a firearm as set forth in claim 1, wherein said base member comprises a clamp means for clamping engagement to said scope of the firearm.

3. An image capture device mounting assembly for a firearm as set forth in claim 2, wherein said clamp means comprises:

a mounting plate for supporting said intermediate plate;

a first clamp element having a concave recess adapted to receive the barrel of said scope, the first clamp element being attached to said mounting plate; and a second clamp element having a concave recess adapted to receive the barrel of said scope, said second clamp element being spaced apart from said first clamp element, said second clamp element being attached to said mounting plate.

4. An image capture device mounting assembly for a firearm as set forth in claim 1, wherein said mounting bracket is detachably mounted on said intermediate plate.

5. An image capture device mounting assembly for a firearm as set forth in claim 1, wherein said mounting bracket is adjustably mounted on said intermediate plate.

6. An image capture device mounting assembly for a firearm as set forth in claim 1, wherein said attachment means comprises a screw adapted to attach said camera to said mounting bracket.

7. An image capture device mounting assembly for a firearm as set forth in claim 1, wherein said attachment means comprises an alignment pin adapted to align said camera.

8. An image capture device mounting assembly for a firearm as set forth in claim 1, further comprising an angle shim adapted to adjust the vertical viewing angle of said camera.

9. An image capture device mounting assembly for a firearm as set forth in claim 1, wherein the mounting bracket is slidably mounted on said intermediate plate.

10. An image capture device mounting assembly for a firearm as set forth in claim 1, wherein said intermediate plate further comprises a locking knob, wherein said locking knob operates in a locked position in which said locking knob engages said mounting bracket and holds said mounting bracket in position and in a release position in which the mounting bracket is allowed to be detached.

* * * * *